C. E. YOUNG.
NON-SKID TIRE PROTECTOR.
APPLICATION FILED FEB. 20, 1920.
1,386,668. Patented Aug. 9, 1921.
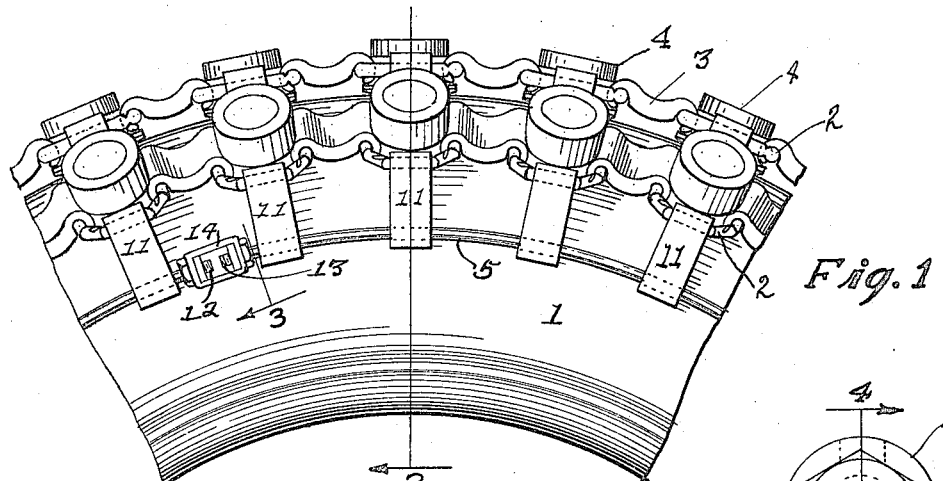
Fig. 1
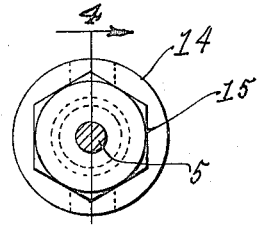
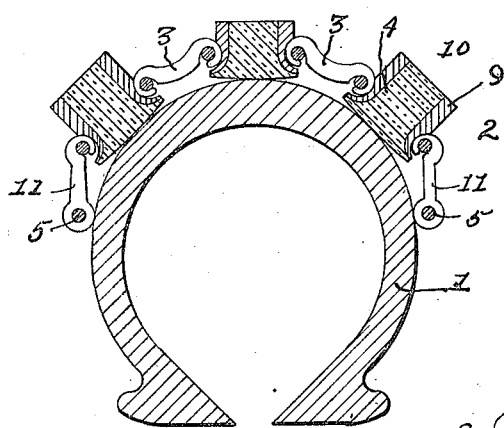
Fig. 2
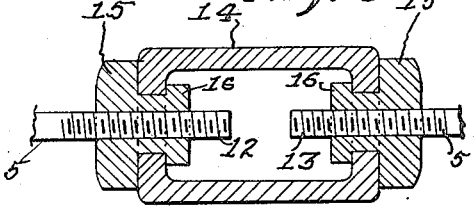
Fig. 3
Fig. 4
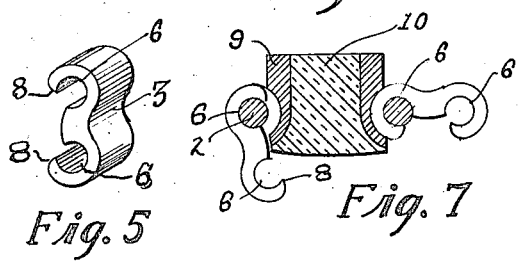
Fig. 5
Fig. 7
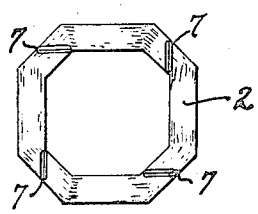
Fig. 6
Charles E. Young
INVENTOR.
BY J. E. Shannon
ATTORNEY.

UNITED STATES PATENT OFFICE.

CHARLES E. YOUNG, OF AKRON, OHIO.

NON-SKID TIRE-PROTECTOR.

1,386,668.   Specification of Letters Patent.   Patented Aug. 9, 1921.

Application filed February 20, 1920. Serial No. 360,249.

*To all whom it may concern:*

Be it known that I, CHARLES E. YOUNG, a citizen of the United States, residing at Akron, in the county of Summit and State of Ohio, have invented new and useful Improvements in Non-Skid Tire-Protectors, of which the following is a specification.

This invention relates to certain improvements in protective coverings for elastic vehicle tires, and has particular reference to a protective device which is provided with means to prevent slipping and skidding of such tires when in use on a wet, icy or otherwise smooth or slippery surface.

The main object of the invention lies in the provision of a simple, durable, economical device which will protect the tire from injury and at the same time effectually prevent slipping and skidding.

An equally important object is to provide a non-skidding attachment for vehicle tires which is made up of a plurality of separable sections so that portions of the device may be quickly removed and easily replaced when broken or otherwise rendered unfit for use.

An additional object is to provide a simple, inexpensive, holding means for a series of loosely mounted lugs so that the same will be positioned at intervals around the periphery of a tire.

I accomplish the above and other objects by the novel construction, arrangement and combination of parts herein fully described and illustrated in the accompanying drawing wherein is shown an embodiment of the invention, it being understood that changes and modifications may be resorted to which come within the spirit of the invention and the claims hereunto appended.

In the drawings in which similar numerals of reference are used to designate corresponding parts throughout the several views, Figure 1 is a side elevation of a portion of a vehicle tire having an embodiment of the invention positioned thereon.

Fig. 2 is a cross sectional view of same taken approximately on line 2 of Fig. 1.

Fig. 3 is an enlarged sectional view taken on line 3 of Fig. 1 illustrating particularly an end view of the fastening device employed.

Fig. 4 is an enlarged longitudinal sectional view taken approximately on line 4 of Fig. 3.

Fig. 5 is an enlarged perspective view of one of the links employed in holding the various parts of the device in an assembled condition.

Fig. 6 is a plan view of the octagonal ring-like member constituting a portion of the device.

Fig. 7 is a cross sectional view showing the manner of assembling the various parts.

In carrying out the invention, I employ a detachably connected series of links of metal or other material. One of the links, shown in Fig. 6, is of ring-like octagonal form in plan, having four long and four short sides alternately disposed, each side being of circular cross section; the other link, shown in Fig. 5, is connected so that it resembles a figure 3 in longitudinal cross section and is provided with a suitable, cylindrical, laterally extending bore 6 at each end thereof; the said bore 6, being open along one side thereof, forms a broad hook adapted to receive and rotatably hold one of the long sides of the octagonal link 2. Each short side of the link 2 is provided with a groove 7 which extends transversely thereacross approximately in line with the inner side of the adjacent long side of the link 2. The slot has a cross sectional shape corresponding to the shape of the extreme end 8 of the link 3 and is arranged so that the end of the link 3 may be slipped from the ring 2 when held in the position shown in Fig. 7. The groove 7 is arranged to receive the extreme end 8 of the link 3 when the said link 3 is inclined with the other end thereof positioned under the ring 2. In this position the link 3 may be slid longitudinally over one of the long sides of the octagonal ring 2 and when rotated upwardly in the position shown in Figs. 1 and 2 cannot be disengaged therefrom, inasmuch as the extreme end 8 of the link is out of alinement with the groove 7. The lug 4 comprises a metallic shell 9 having a central portion 10 of rubber, or other resilient material, the bore in the shell 9 being flared at the bottom of the lug and the rubber 10 arranged to underlie the base thereof so as to prevent contact of the metallic shell 9 with the face of the tire 1. The members 11 are similar to the link 3 except that one end terminates in an unbroken cylindrical bore adapted to receive the fastening cable 5 which terminates in rod-like threaded ends 12 and 13 which are adapted to be received by the fastening device shown in cross section in Fig. 4. The fastening device comprises a holding member 14 having a nut 15 rotatably secured in each end thereof, the nut 15 being retained in the member 14 by the collar 16.

In use, the lug 4 is first placed in the octagonal link 2 and a link 3 is then placed in each long side of the ring 2 in the position shown in Fig. 7. The free end of each link is similarly connected to other rings 2, each provided with a lug 4, and a plurality of links 2 and 3 and the lugs 4 are thus connected until an annular web has been formed which will cover the peripheral portions of the tire.

As hereinbefore set forth, along the lateral edge of the web, the members 11 are substituted for the links 3 so that the cylindrical bores in the free ends of the members or links 11 run substantially at a right angle to a radius of the tire 1; the cable 5 is then threaded through the bores in the members 11 and the ends 12 and 13 of the cable 5 are then placed in the openings in the nuts 15, and the nuts are operated on the said ends 12 and 13, thus contracting the cable and holding the web firmly about the peripheral and lateral portions of the tire.

It is to be understood that the device may be used without the lugs 4 as an ordinary non-skid chain and that any suitable means may be employed to retain the web on the tire. It will be noted that the lugs 4 are securely held in the ring 2 between the extreme ends 8 of the link 3 and that no portion of the lug 4 comes in contact with the ring 2.

Attention is also called to the fact that the lug has a circumferentially extending groove adjacent its lower edge in which the ends 8 of the links 3 are adapted to seat, this portion of the lug being of circular cross section permits the free rotation thereof so that in use, upon the road, the contacting surface of the lug will wear away evenly.

While I have shown and described an adaptation of my invention as used on resilient tires, it is nevertheless to be understood that the same may be applied to a steel tire or felly or other road engaging peripheral surface of a wheel.

It will thus be seen that I have provided new and novel tire protecting means which will effectually prevent slipping and skidding and which may be used on heavily loaded vehicles without injury to the pavement or other road engaging surface.

Having thus described my invention what I claim as new and desire to secure by Letters Patent is:—

1. A covering for vehicle tires comprising a plurality of octagonal ring-like members connected by detachable links adapted to hold said members in spaced relation around the peripheral portions of a tire, a road engaging lug positioned in each of said members, said lugs being detachably secured therein by said links.

2. In a covering for vehicle tires, an annular web including a plurality of rings, links detachably connecting said rings and rod engaging lugs detachably secured in said rings by said links.

3. A covering for vehicle tires comprising an annular web composed of a plurality of octagonal ring-like members each having four long and four short sides, a slot formed in each short side, said slot being in alinement with the inner edge of the adjacent long side, means to detachably connect each long side of each member to a long side of an adjacent member said means comprising links having a hook at each end, each hook adapted to be slid over one of said long sides when registered in one of said slots.

4. In a covering for vehicle tires an annular web made of a plurality of octagonal ring-like members each having alternately disposed long and short sides, each long side of each member being detachably connected to a long side of a similar member by means of a broad link, each end of said link provided with a laterally extending bore open along the under side to provide a hook adapted to slide over one of the short sides of said member and engage a long side thereof so that the said long side may be positioned within said bore.

5. A protective covering for vehicle tires comprising an annular web composed of a plurality of ring-like members connected by detachable means, a lug held within each of said members by said connecting means and means to secure said covering around the peripheral portions of a tire.

6. In a device of the class described the combination of a plurality of octagonal ring-like members, means to detachably connect said members in the form of an annular sheath, a lug loosely held in said members by said connecting means and means to detachably secure said sheath around the peripheral portions of a tire.

7. A protective sheath and non-skidding device for vehicle tires comprising in combination, a plurality of ring-like members, a lug in each member and connecting links arranged to secure said members in annular formation, a circumferentially extending groove in each lug, the ends of said links adapted to seat in said groove to retain the lug in said member.

In testimony whereof I have hereunto set my hand.

CHARLES E. YOUNG.